No. 874,989. PATENTED DEC. 31, 1907.
G. G. PORTER.
STEERING GEAR.
APPLICATION FILED JUNE 10, 1907.
2 SHEETS—SHEET 2.
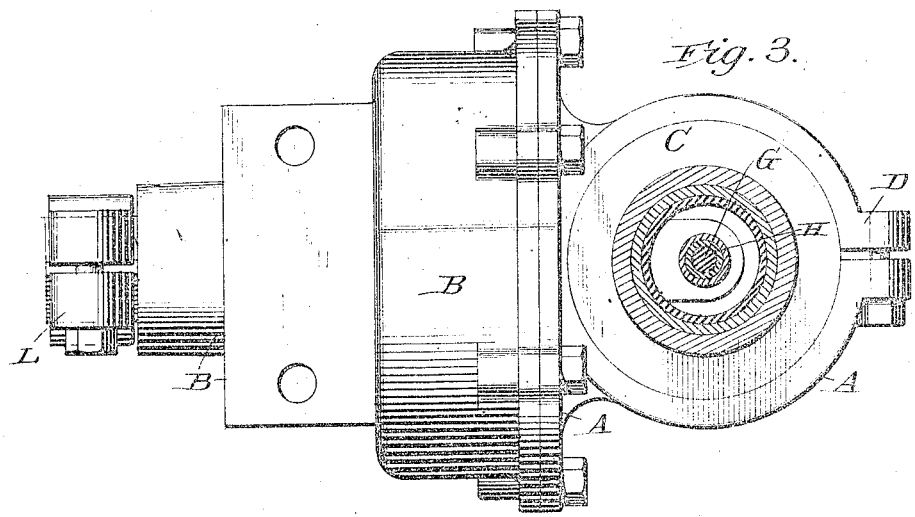
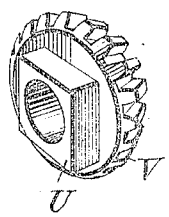
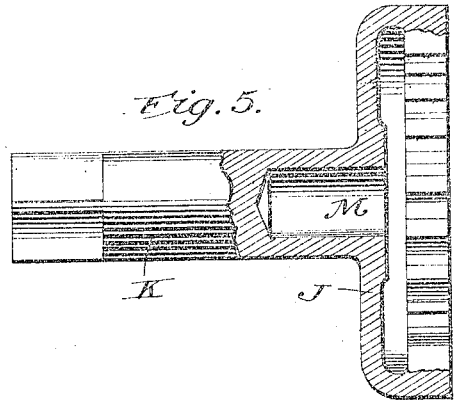
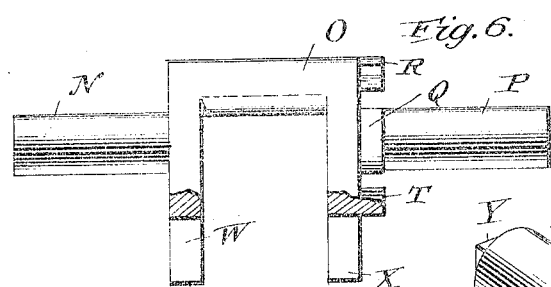
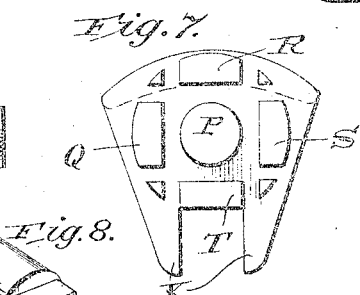
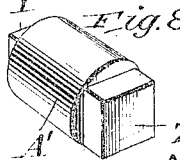

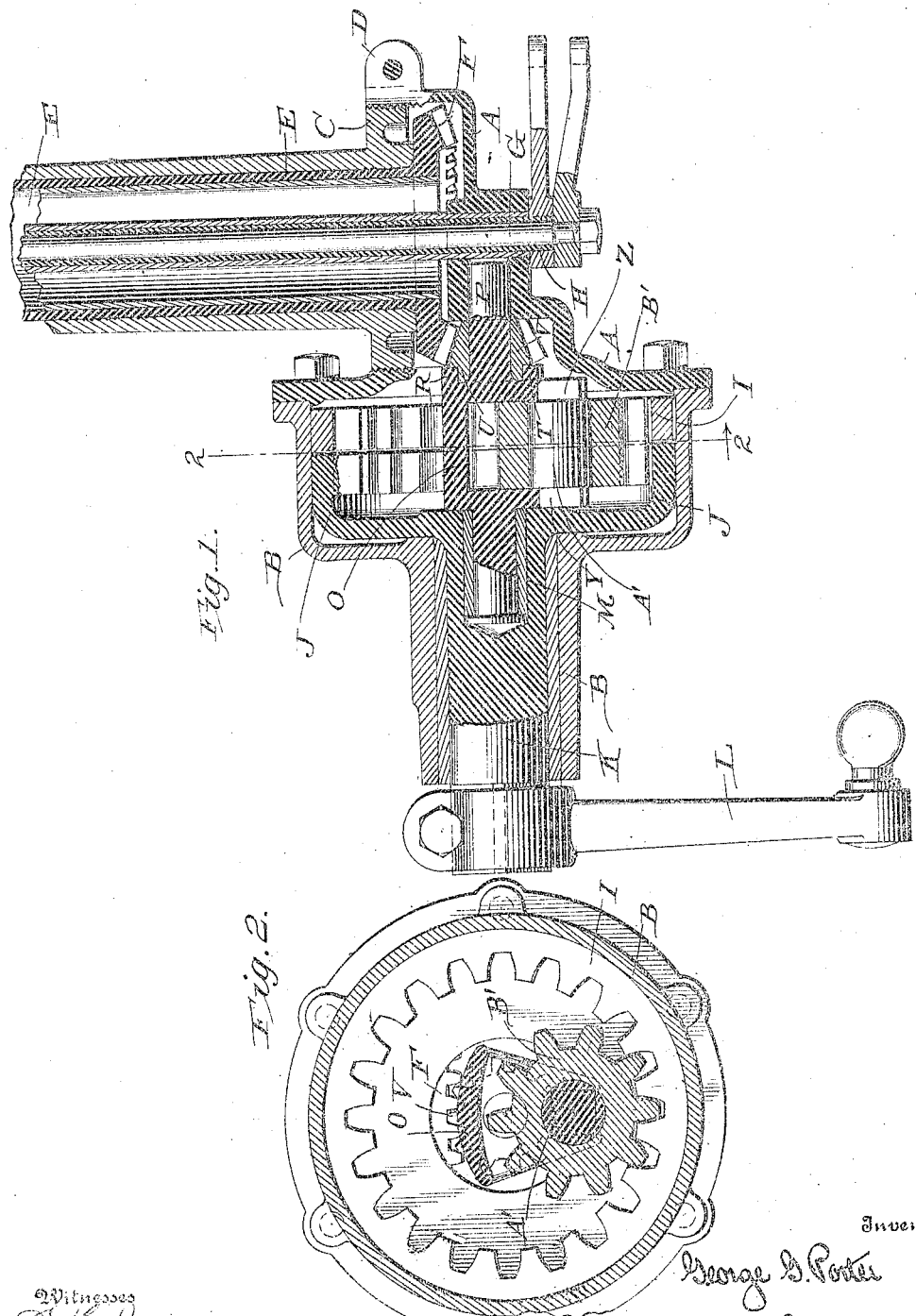

UNITED STATES PATENT OFFICE.

GEORGE G. PORTER, OF SYRACUSE, NEW YORK, ASSIGNOR TO THE PORTER-CABLE MACHINE CO., OF SYRACUSE, NEW YORK, A CORPORATION OF NEW YORK.

STEERING-GEAR.

No. 874,989.  Specification of Letters Patent.  Patented Dec. 31, 1907.

Application filed June 10, 1907. Serial No. 378,202.

*To all whom it may concern:*

Be it known that I, GEORGE G. PORTER, a citizen of the United States, residing at Syracuse, in the county of Onondaga and State of New York, have invented certain new and useful Improvements in Steering-Gears, of which the following is a specification.

My present invention pertains to improvements in steering-gear for automobiles and like vehicles, the construction and advantages of which will be hereinafter set forth, reference being had to the annexed drawings, wherein:

Figure 1 is a vertical sectional view of the steering-gear; Fig. 2 a vertical sectional view taken on the line 2—2 of Fig. 1; Fig. 3 a top plan view of the gear with the steering-post and allied parts shown in section. Fig. 4 a perspective view of the bevel pinion employed in the gear; Fig. 5 a sectional elevation of the combined gear and shaft; Fig. 6 a detail view of the swinging frame or carrier on which the traveling pinion is mounted; Fig. 7 an end elevation of said part; Fig. 8 a perspective view of the axle upon which the traveling pinion is mounted; and Fig. 9 an end elevation thereof.

The main object of my present invention is to provide a simple and efficient device in which all shock due to the wheels of a vehicle meeting an obstruction is prevented from being transmitted to the steering-wheel through the steering-post and to the bevel gear connected to the post and the bevel pinion meshing therewith.

A further object of the invention is to provide a simple and efficient means for securing proper adjustment of the parts so that they will work closely and easily and yet be capable of adjustment so as to compensate for wear.

With the construction shown and hereinafter described in detail the parts "backlock" perfectly. Furthermore, the parts may be comparatively light and still of sufficient strength to resist road shocks. The gear may be readily positioned in any car, and any desired angle of operation of the steering-post and steering member be readily obtained.

As will be evident, there is a minimum amount of friction in the operation of the parts, and, therefore, the question of lubrication is greatly simplified, it being unnecessary to have the parts flooded with oil, as in the case of worm gearing and other structures in which considerable friction is present.

The housing for the gearing is composed of a two-part shell or casing, the parts being designated by A and B. The member A is provided with an annular opening in its upper face which is internally threaded for the reception of the lower threaded end of the supporting column or bearing member C.

As will be noted upon reference to Figs. 1 and 3, the shell or casing A is split and provided with ears D which, when the member C is screwed down into its adjusted position, may be clamped so as to hold the parts against movement.

Mounted within the bearing member C is the steering-post E, carrying at its lower end a bevel gear F. Spark and throttle-control rods designated by G and H are passed down through the steering-post and through the lower portion of the shell or casing A, the construction being such that these members may be so positioned without in any manner interfering with the rest of the mechanism, a point of manifest advantage.

Located within the enlarged portion of the shell or casing B is a ring-shaped member or gear I, the member being made fast to the shell and provided with a series of teeth, say, twenty, upon its inner face. A second gear J is also mounted within this portion of the shell B standing immediately adjacent to the gear I but being free to rotate within the shell or casing. Said gear J is formed upon the outer end of a shaft or axle K, the other end of which is squared and has secured to it the steering member L. A socket or bearing M is formed in the axle K, said socket receiving the axle N of a pinion-carrier O. A second axle P, extending outwardly from the opposite side of said pinion-carrier, projects into a bearing formed in the shell or member A, as will be clearly seen upon reference to Fig. 1.

The face of the carrier adjacent to the axle P is formed with an annular projection which is afterwards run under a milling cutter making four cuts through the projection and thereby forming lugs Q, R, S, T, the flat faces of which stand adjacent to the axle P. These lugs receive between them the squared end U of a bevel pinion V, which latter is slipped over the axle P and when the parts are in position meshes with the gear F. This formation of the locking lugs is a cheap manner of producing the parts. It is conceivable, of course, that they might be otherwise made, but the method set forth insures the accurate fitting of the squared portion U between the lugs.

The lower end of the pinion-carrier is provided with slotted arms W and X, the slots being adapted to receive the squared ends Y and Z of the journal or axle A' upon which is mounted a pinion B'. As will be seen upon reference to Fig. 1, said pinion is of such breadth as to overlie both the gears I and J and the teeth of the gear I (twenty in number) and the teeth of the gear J (twenty-one in number) are so formed as to mesh with the pinion and yet permit rotation or movement of the pinion over the same.

The side faces of the squared ends Y and Z of the journal A' stand at slightly different distances from the center of said journal, the difference being relatively slight but sufficient so that if the journal be withdrawn from the slotted arms W and X and turned before being reëntered adjustment for wear may be effected. This affords a ready means for compensating for wear of the parts, without the necessity of using adjusting screws, nuts or the like.

The gear F may be kept in proper mesh with the pinion V by merely loosening the bolt which clamps the ears D and screwing the member C down upon the upper flat face of the gear F, thereby moving the gear down into proper working relation with the pinion. When proper adjustment is had the parts are again clamped.

The operation of the mechanism will be readily appreciated. Upon turning the steering wheel and consequently the steering-post, motion will be transmitted from gear F to bevel pinion V and through said pinion to the pinion-carrier or frame O and as a consequence the pinion B' will be caused to move around upon the fixed gear I. By reason of the difference in the number of teeth in the gears I and J the gear J and its attached parts, will be advanced one tooth for each complete revolution of the pinion-carrier or frame O about its axis. Therefore, for, say, five revolutions of the pinion-carrier O the gear J will be advanced the distance of five teeth, or about one-fourth of its circumference. This effecting a movement of the steering member L through ninety degrees, will be sufficient to throw the wheels hard over from one side to the other.

The ratio of the gearing as shown is about eight turns of the hand-wheel to one complete revolution of the steering member L. In other words, it takes two revolutions of the hand wheel or steering-post to throw the steering member L through an arc of ninety degrees, which as will be readily appreciated is but little more than is usually required to turn the wheels from hard over to hard over.

It has been demonstrated that the construction herein described is positively back-locking. Therefore, all road shocks on the wheel are taken up by the teeth of the internal gears I and J and the intermeshing pinion B'. No strain is, therefore, placed upon the bevel pinion V and the bevel gear F, so that these parts may be made relatively light.

The back-locking just referred to takes place by reason of the fact that the tooth or teeth of the pinion B' which is in mesh with the gears I and J act as a key and prevent rotation of the gear J through any force applied to said gear through the shaft K and the arm L. The difference between any two adjacent teeth of the gears I and J is so slight that no motion can be transmitted to the pinion through the shaft K. In other words, the pinion serves to lock the gear J to the fast gear I. It will be appreciated, however, that the shaft K and its gear J may be readily rotated by power applied to the pinion B' through the connections heretofore described. The gear may be said to be universal, as the steering member L may be operated through any arc desired without regard to the position in which the shell or casing is mounted in the car. If it were disconnected it could be turned over and over in either direction.

The steering arm may be operated through any arc and is not confined or limited in its travel, as is the case with those gears which employ worms, segments or similar actuating mechanism in which the movement is necessarily limited. The two parts of the casing, designated by A and B, may be so bolted together as to secure any desired angle of inclination of the steering-post. In other words, the steering-post may stand perpendicular or even be brought down to a horizontal position and the operation of the gear is not affected thereby. Another feature of advantage is that the wear of the teeth is distributed over a large area, which obviates the difficulty which obtains with other gears in which the wear is confined to but a few teeth, with the resulting back-lash in some positions and over-tight fitting in others.

The direction of the operation may be made to conform to whatever is required by transposing the teeth of the internal gears; that is to say, if the gear I is made with twenty-one teeth and gear J with twenty teeth the direction of movement of the steering member L relatively to the hand-wheel would be opposite to that shown in the drawings.

Having thus described my invention, what I claim is:

1. In combination with a steering member; a steering-post; a gear secured to the steering member; a fixed gear provided with a greater number of teeth than the first gear;

a pinion meshing with both of said gears; and connections between the steering-post and the pinion for moving the latter over the gears.

2. In combination with a steering member; a toothed member connected thereto and movable therewith; a fixed toothed member, one of said toothed members having a greater number of teeth than the other; a pinion meshing with both of said toothed members; a steering-post; and connections between said post and the pinion for traversing the same over the toothed members.

3. In combination with a steering-post; a steering member; a gear movable with said member; a fixed gear, the number of teeth upon one gear being greater than that on the other; a pinion meshing with both of said gears; a pinion-carrier; and connections intermediate the steering-post and carrier for moving the latter and thereby causing the pinion to traverse the gears.

4. In combination with a steering-post; a steering member; an internal gear movable with said member; a fixed internal gear, the number of teeth upon said gears being different; a pinion meshing with both of said gears; a pinion-carrier mounted within the gears; and means interposed between said carrier and the steering-post for actuating the carrier.

5. In combination with a steering-post; a steering member; an internal gear movable with said member; a fixed internal gear, the number of teeth upon said gears being different; a pinion meshing with both of said gears; a rotatable pinion-carrier having its axis coincident with the axis of the gears; and a beveled pinion for rotating said carrier; and a beveled gear secured to the steering-post and meshing with the pinion.

6. In combination with a steering-post; a steering member; an internal gear; an axle extending from the gear and secured to the steering member; a fixed internal gear, the number of teeth upon said gears being different; a pinion meshing with said gears; a journal for said pinion; polygonal projections on the ends of the journal, the flat faces of the projections standing at different distances from the center of the journal; a pinion-carrier, said carrier being provided with arms to receive the polygonal projections of the journal; a bevel pinion secured to the carrier; and a bevel gear meshing with the bevel pinion and secured to the steering-post.

7. In combination with a steering-post; a steering member; an internal gear movable with said member; a fixed internal gear, said gears having different numbers of teeth; a pinion meshing with both of said gears; a journal for the pinion; polygonal projections on the ends of the journal, the various flat faces of the projections being at different distances from the axis of the journal; a pinion-carrier provided with arms to receive said projections; and means interposed between the steering-post and the carrier for actuating the latter.

8. In combination with a steering-post; an actuating member secured to the lower end thereof; a shell or casing provided with a threaded opening; a supporting or bearing member for the post, said member having a threaded end adapted to enter the threaded opening; and means for clamping the shell upon said threaded end.

9. In combination with a steering-post; a bevel gear mounted upon the lower end thereof; a steering member; a bevel pinion for actuating said member, said pinion meshing with the gear; a shell or casing having a threaded opening; and a bearing member for the post, said bearing member having a threaded end adapted to enter the threaded opening and to bear upon the upper face of the bevel gear and maintain it in proper mesh with its pinion.

10. In combination with a steering-post; a bevel gear mounted upon the lower end thereof; a bearing member for said post provided with a threaded end; a shell or casing having a threaded opening to receive said end; means for securing the shell and bearing member in their adjusted positions; an axle mounted in the shell; an internal gear carried thereby; a steering member secured to the axle; a second internal gear secured within the casing, one gear having a greater number of teeth than the other; a pinion meshing with said gears; a pinion-carrier rotatable within the gears; and a beveled pinion secured to said carrier and meshing with the bevel gear carried by the steering-post.

In testimony whereof I have signed my name to this specification in the presence of two subscribing witnesses.

GEORGE G. PORTER.

Witnesses:
 FRANK E. CABLE,
 GILES B. EVERSON.